Sept. 9, 1924.  
F. A. WEGNER  
AUTOMOBILE BODY  
Filed Nov. 8, 1920

Inventor  
Frederick A. Wegner  
By Munday, Clarke & Carpenter  
Attys

Sept. 9, 1924.  F. A. WEGNER  1,508,039
AUTOMOBILE BODY
Filed Nov. 8, 1920   11 Sheets-Sheet 2

Inventor
Frederick A. Wegner
By Munday, Clarke & Carpenter
Attys

Sept. 9, 1924. 1,508,039
F. A. WEGNER
AUTOMOBILE BODY
Filed Nov. 8, 1920 11 Sheets-Sheet 5

Sept. 9, 1924.  
F. A. WEGNER  
1,508,039  
AUTOMOBILE BODY  
Filed Nov. 8, 1920  11 Sheets-Sheet 7

Inventor  
Frederick A. Wegner  
By Munday, Clarke & Carpenter  
Attys

Sept. 9, 1924.

F. A. WEGNER

AUTOMOBILE BODY

Filed Nov. 8, 1920

Sept. 9, 1924.  F. A. WEGNER  1,508,039
AUTOMOBILE BODY
Filed Nov. 8, 1920   11 Sheets-Sheet 9

Inventor
Frederick A. Wegner
By Munday, Clarke & Carpenter
Attys

Sept. 9, 1924.  F. A. WEGNER  1,508,039
AUTOMOBILE BODY
Filed Nov. 8, 1920   11 Sheets-Sheet 11

Inventor
Frederick A. Wegner
By Munday, Clarke & Carpenter Attys

Patented Sept. 9, 1924.

1,508,039

UNITED STATES PATENT OFFICE.

FREDERICK A. WEGNER, OF GOSHEN, INDIANA.

AUTOMOBILE BODY.

Application filed November 8, 1920. Serial No. 422,407.

*To all whom it may concern:*

Be it known that I, FREDERICK A. WEGNER, a citizen of the United States, residing in Goshen, in the county of Elkhart and State of Indiana, have invented a new and useful Improvement in Automobile Bodies, of which the following is a specification.

This invention relates in general to vehicle bodies and has more particular reference to bodies for automobiles.

A principal object of the invention is the provision of an automobile body which, while of pleasing appearance, may be used by simple readjustment either as a pleasure car body or a truck body. The invention contemplates in this connection the provision of an automobile body which may be easily changed from arrangement for pleasure use to arrangement for truck use and vice versa, to enable the body to be alternately used for these two purposes, thus giving the owner in effect, at all times, both a truck and a pleasure car through the use of a single automobile equipped with such a body.

Another important object of the invention is the provision of an automobile body readily convertible from a five passenger capacity to a two or three passenger capacity, and vice versa.

Another important object of the invention is the provision of a five passenger body, the parts of which will be so constructed and arranged that space may be provided within the body for the carrying of a trunk, suitcase or other articles, and this without obstructing the usual spaces provided in front of both the front and rear seats.

Another important object of the invention is the provision of an automobile body arrangeable in attractive form for use as a pleasure car and extensible into a longer body to provide a truck, and this without requiring the addition of any parts not carried within and forming a part of the body when arranged for pleasure use.

Another important object of the invention is the provision of an automobile body usable either as a five passenger car or as a runabout and in each arrangement having provision for the carrying of luggage at the rear.

Another important object of the invention is the provision of an automobile body readily arrangeable at night to provide a sleeping compartment.

Another important object of the invention is the provision of a body which may be converted in these several and other fashions, which will be of unusually pleasing appearance and which arranged for any particular use will not betray in its appearance the adaptability of the body to other uses.

A further object of the invention is the provision of an automobile top for use in connection with automobile bodies of the character earlier set forth and of other characteristics, which will effectively shade the wind shield from the direct rays of the sun and in this manner prevent blinding of the driver.

Another important object of the invention is the general improvement in automobile body construction.

Numerous other objects and advantages of the invention will be apparent as it is better understood from the following description, which, considered in connection with the accompanying drawings, discloses a preferred embodiment thereof.

Referring to the drawings,

Fig. 3 is a view showing the arrangement of the body to provide sleeping accommodations;

Fig. 5 is a similar view through the body when arranged as shown in Fig. 3;

Figure 1:
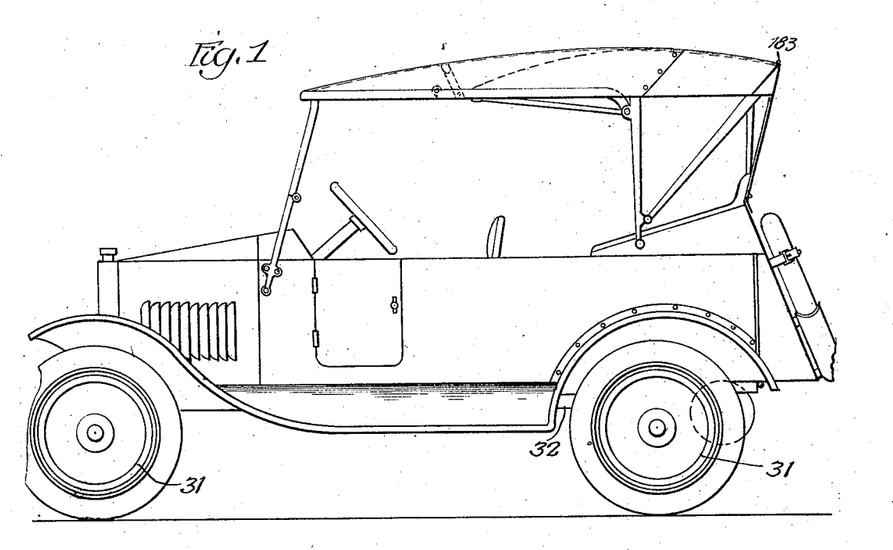
Figure 1 is a side elevation of an automobile body embodying my present invention and showing the arrangement as a five-passenger car.

For the purpose of illustrating my invention I have shown on the drawing an automobile body in which it is embodied, and adapted for ready installation upon chassis, and this without modification of said chassis in any respect to receive the body. The body embodying my present invention is adapted for arrangement as a five-passenger touring car, a runabout, a small truck and a large truck, and a touring outfit permitting arrangement to provide sleeping accommodation. These several arrangements are adapted to be accomplished without requiring the addition or subtraction of an appreciable number of parts in re-arrangement from one to another form. Viewing Fig. 1 the arrangement is shown to provide a five-passenger or sport-model car. Viewing Fig. 2 the arrangement is shown to provide a runabout or roadster and in Fig. 3 the arrangement is shown for sleeping accommodation and, as will be presently disclosed, for providing a truck having a long body and of considerable capacity. The arrangement of Fig. 2 permits of the provision of a short truck by the mere removal of the cover behind the seat. In general these various rearrangements are permitted in the present instance by providing front seats movable to an inoperative position and a rear seat movable from rear to front position, in which latter position the rear seat occupies the position formerly occupied by the front seat, leaving the rear body open for truck uses or permitting it to be covered to provide a runabout or roadster. The rear of the body also, in the present instance, is adapted to be extended in order to permit the carrying of luggage when the automobile is arranged for carrying five passengers, without obstructing the space provided in front respectively of the front and rear seats and also to provide for an elongation of the body for truck purposes.

Figure 20:
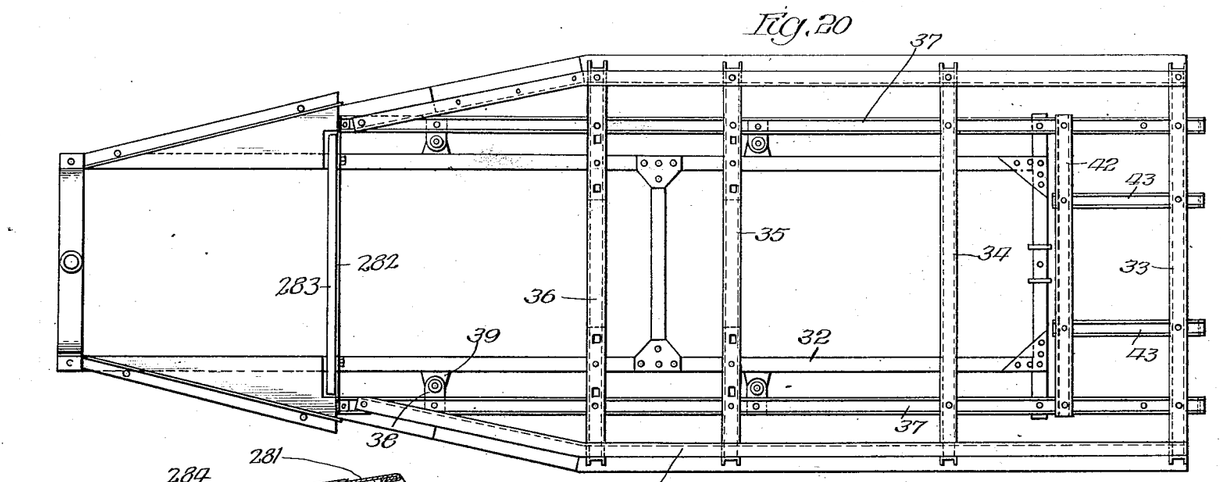
Fig. 20 is a plan of the body framework.
Figure 21:
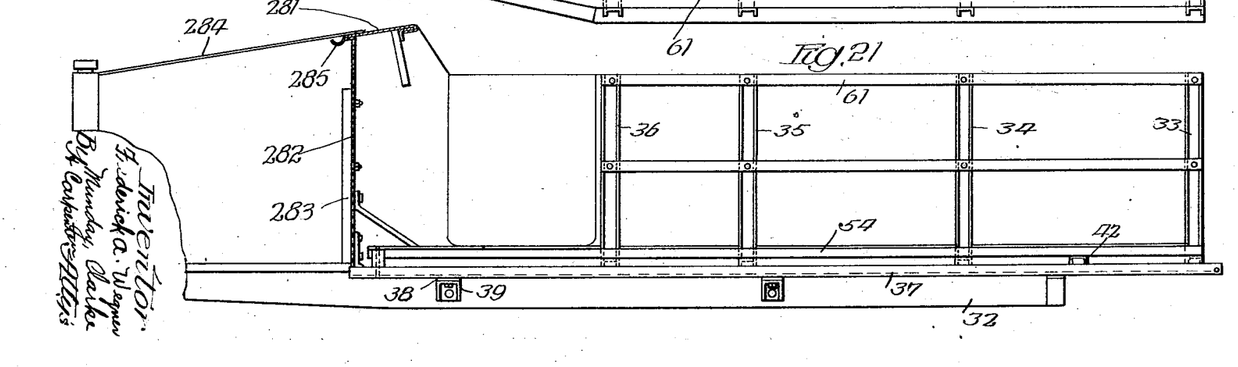
Fig. 21 is an elevation thereof.

For the purpose of illustrating my present invention I have shown on the drawing a chassis diagrammatically upon the diagram and having wheels 31 and the usual framework 32 of any preferred construction. Figs. 20 and 21 illustrate the framework upon which the body shown on the drawing is built up.

Figures 22, 23, 24, 25:
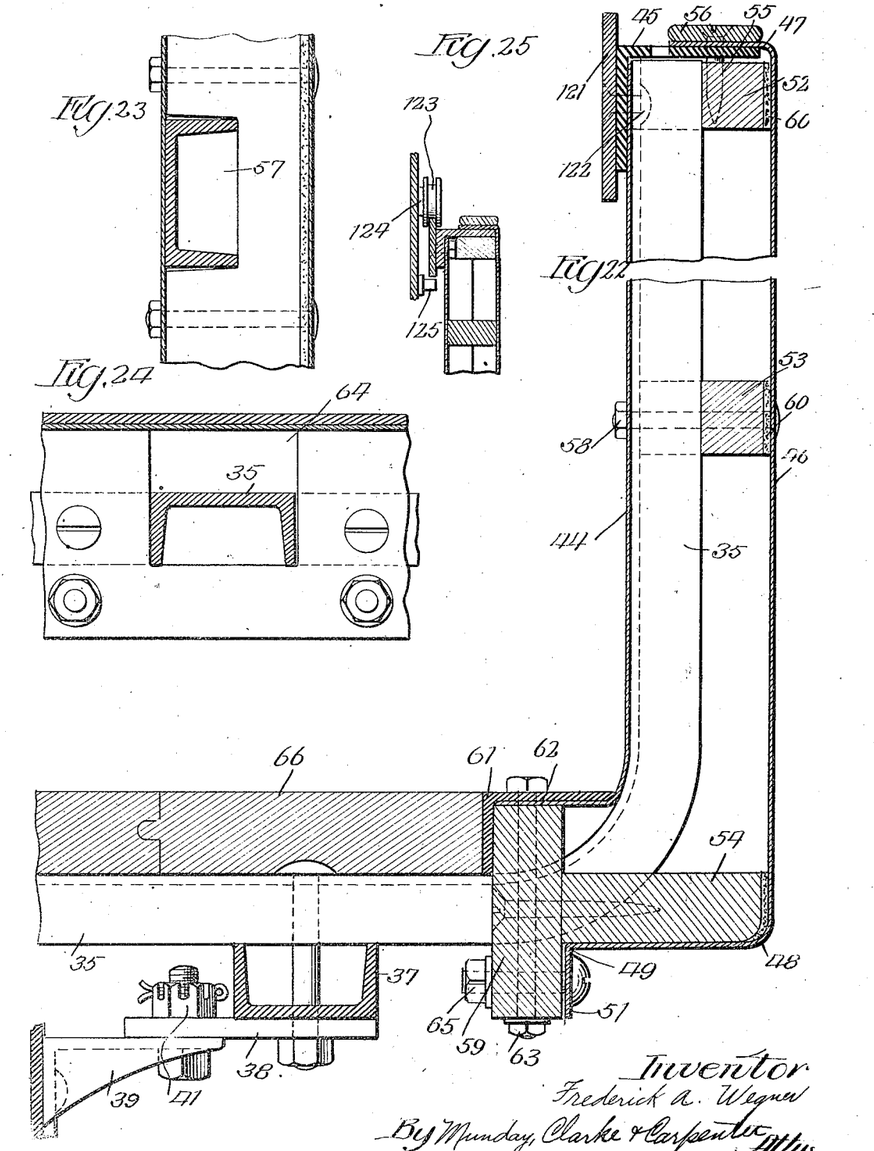
Fig. 22 is an enlarged vertical section showing the body wall construction.
Fig. 23 is a partial sectional view taken at right angles to Fig. 22.
Fig. 24 is a vertical section taken adjacent the side walls.
Fig. 25 is a detail section showing the hangers for the rear seat.
Figures 25, 26:
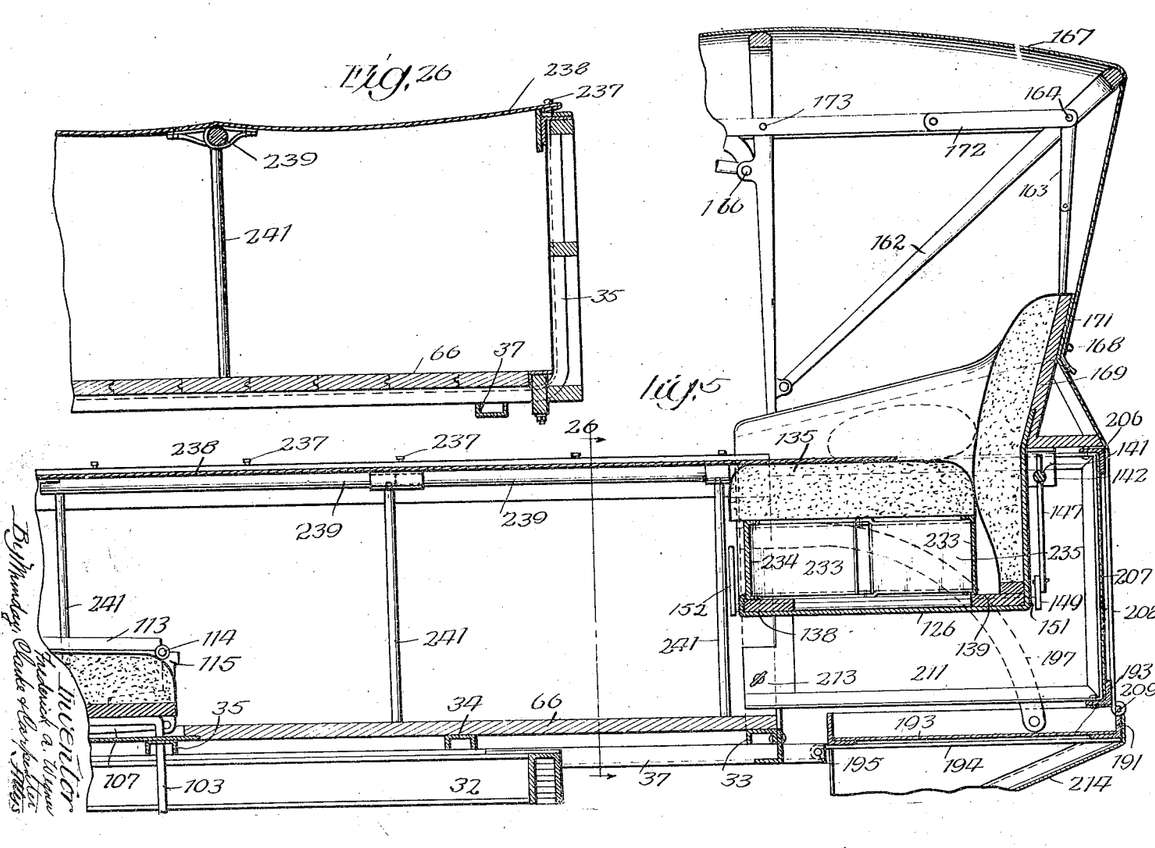
Fig. 26 is a section taken substantially on the line 26—26 of Fig. 5.

A number of channel irons 33, 34, 35 and 36 are bent to U-form permitting them to extend up at each side and across the bottom, i. e. beneath the floor. Two longitudinal channels 37 are arranged beneath the channels 33 to 36 to which the channels 33—36 are fastened. These channels 37 are provided with attaching lugs 38 arranged to be disposed over the attaching lugs 39 of the chassis and to be bolted in place as indicated at 41 in Fig. 22 to secure the body to the frame. The lugs 39 are preferably the usual lugs for attaching the body and the location of the lugs 38 to match therewith permits, as will be presently more readily understood, the positioning of this body upon a chassis with a minimum amount of attendant labor.

The back portion of the frame is provided with cross channel 42 secured at its ends on the channels 37 and supporting the front ends of short intermediate channels 43, the outer ends of which are secured to the rear channel 33. To the inner face of the upright portions of the channels 33—36 are secured body plates 44, such body plates being provided at their tops with angle irons extending out from the tops of the channels. Outer body plates 46 are provided having their upper edges turned over as indicated at 47 on to the upper faces of the angles 45. The outer body plates 46 are bent in, as indicated at 48, horizontally and then downwardly as indicated at 49 to provide a flange 51 extending down beneath the body and inwardly of this edge. Brace members 52 and 53 and 54 of wood are arranged to extend lengthwise of the body walls and form braces for the outer body wall, as will be readily understood The top brace 52 is secured in place by screws 55 taking through the upper edge of the outer body wall, through also the flange of the angle iron 45 and into the brace 52. These screws also pass through a facing strip 56 provided upon the upper edge of the body and near its outer side. The brace 53 is ararnged with its width horizontal and bears against the inner body wall 44, being cut away as indicated at 57 to pass the upright channel parts. Bolts 58 pass through the two walls and through the brace 53 to lock the parts together. The brace 54 has secured to it a member 59 preferably of wood forming with the brace 49 a T one side of which bears against and is secured to an angle member 61 mounted above the end of the horizonal portions of the upright channel 33 to 36. The lower edges 62 of the inner wall plates 44 are arranged beneath these channels and bolts 63 extending through the angles 61 and the edge 62 of the body wall and the members 59 hold the parts in assembled relation. The braces 54 and the members 59 are cut away to permit passage of the channels as is indicated at 64 in Fig. 24. I prefer also to provide felt spacing strips 60 upon the faces of the braces 52, 53 and 54 to permit a more or less yielding engagement to permit drawing the parts tightly together and to eliminate any chance of rattling in service. The flanges 51 of the outer wall plates are arranged in parallelism with the members 59 and are drawn tightly there against by bolts 65. Between the two angles 61 the floor of wood or other suitable material 66 may be located and arranged in any suitable fashion.

Just forwardly of the forward channel iron 36 the floor angles 61 are bent and brought over on to the channels 37. Vertical channel members 68 are riveted to the forward faces of the channel 36 and the inner and outer body sheets 44 and 46 are cut to provide a door opening, the edges of these sheets being bent back around the channel flanges, as indicated at 69, and a finishing strip 71 being provided and secured by screws 72 against the channels and the bent over wall edges.

A similar channel 73 is provided at the other side of the door opening and front outer wall plate 74 and front inner wall plate 75 are fastened in like manner to the channel 73, a facing plate 76 being also provided and secured in place by screws 77. The inner and outer wall plates 74 and 75 may be continuations of the wall plates 44 and 46, if desired, or they may be separated and connected together at the bottom of the door. Any preferred form of hood 79 and cowl 281 may be provided, if desired.

The doors indicated generally by reference character 82 may be of any preferred character and may be hinged as indicated at 83 on the channel 73 and locked into the facing plate 71.

I provide, in the present instance, two front separated seats adapted to be moved down out of the way against the floor to permit the rear seat, to be presently described, to take the position formerly occupied by the front seats. Each said front seat comprises a seat portion 101 formed upon a rigid base 102 from which depends four rods 103 forming legs. These rods at each side are formed by bending a single piece of material to provide a central portion 104 bolted or otherwise secured at 105 to the underpart of the seat base 102 and freely slidable through openings at 106 through the floor and through the channel irons 35 and 36 respectively. At the front and back holding legs 107 are provided, these being pivotally mounted at 108 in brackets 109 extending down from the front and back of the seat. The legs 107 at the back are made of a single piece of rod bent to provide a central portion passing through the lugs 109 and capable of being swung from the position shown in Fig. 4 up under the seat to permit the seat to move down against the floor. Cotter pins 111 may be provided in the lower ends of the legs 103 to prevent the seat being raised away from the floor and these cotter pins may be removed to permit removal of the seat. When the seat is raised from lower to upper position the supporting legs 107 fall by gravity into supporting position and preferably the wood floor is omitted at the front and replaced by the sheet metal floor 112 shown on the drawing. The backs 113 of the front seats are pivoted at 114 in brackets 115 to fold down against the seat when the seat is in lowered position.

Figure 8:
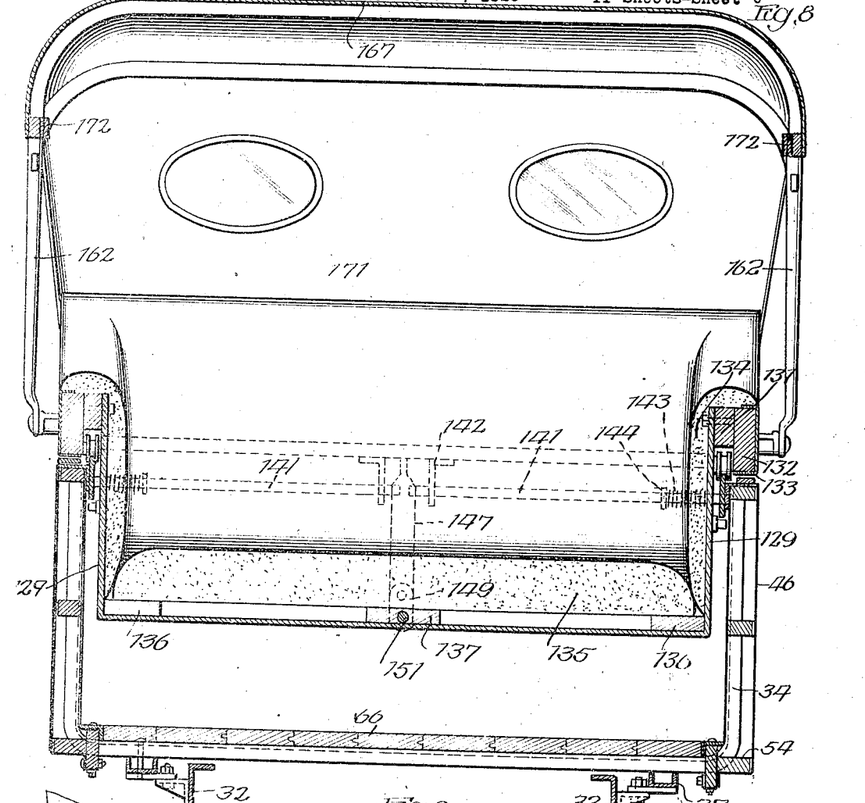
Fig. 8 is a transverse section through the back seat.
Figure 9:
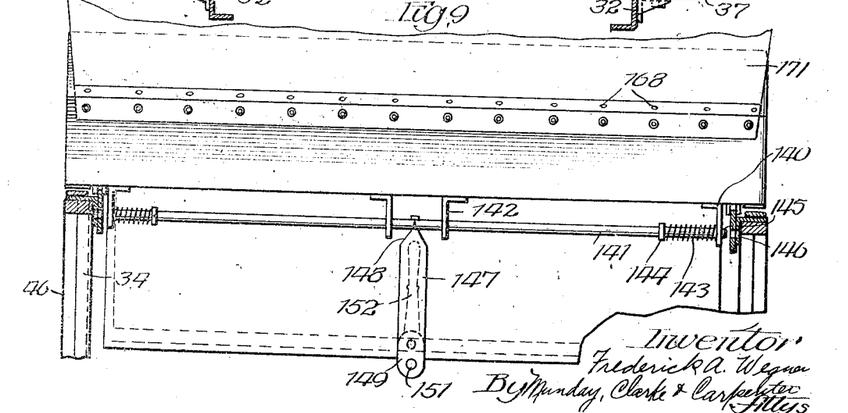
Fig. 9 is a fragmentary rear view of the back seat.
Figure 10:
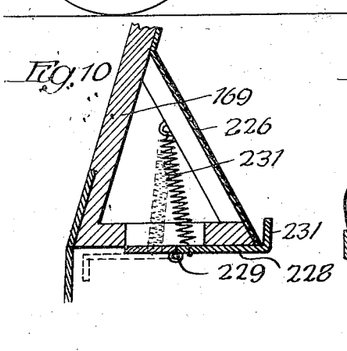
Fig. 10 is a partial vertical front-to-back section showing the rear part of the back seat.

The rear seat is mounted to slide or roll freely on side rails carried at the upper inner edges of the side walls. Viewing Figs. 22 and 25 it will be noted that a track member 121 is fastened by rivets or otherwise at 122 through the angles and through the channels and this is adapted for engagement by rollers 123 carried on stub shafts 124 extending out from the seat, stop pins 125 being provided upon the seats to prevent the rollers leaving the tracks. Viewing Fig. 4 it will be noted that two such rollers 123 are provided at each side. The seat is constructed of a metal base 126 bent at the front to provide a facing flange 127 and up at the back to provide a rear seat wall 128. This bottom plate is bent up at 129 at each side (Fig. 8) to provide side seat walls, arm supports, and for the carrying of the rollers. Above the rollers a parting strip 131 is arranged at each side and upon this is provided a facing member 132 covered with a metal sheet 133 arranged to be disposed closely adjacent the facing strips at the top of the side wall. Upholstery may be provided at 134 at the sides and back and extending over and about the facing members 131 and 132, and a removable seat 135 is arranged to fit within the sides and backs and upon a wooden framework composing side members 136 and center member 137 and front and back members 138 and 139, which framework rests upon the seat bottom 126. Thus constructed the seat may be rolled or slid from the rear position shown in Fig. 4 to the front position shown in Fig. 6.

Figures 4, 27:
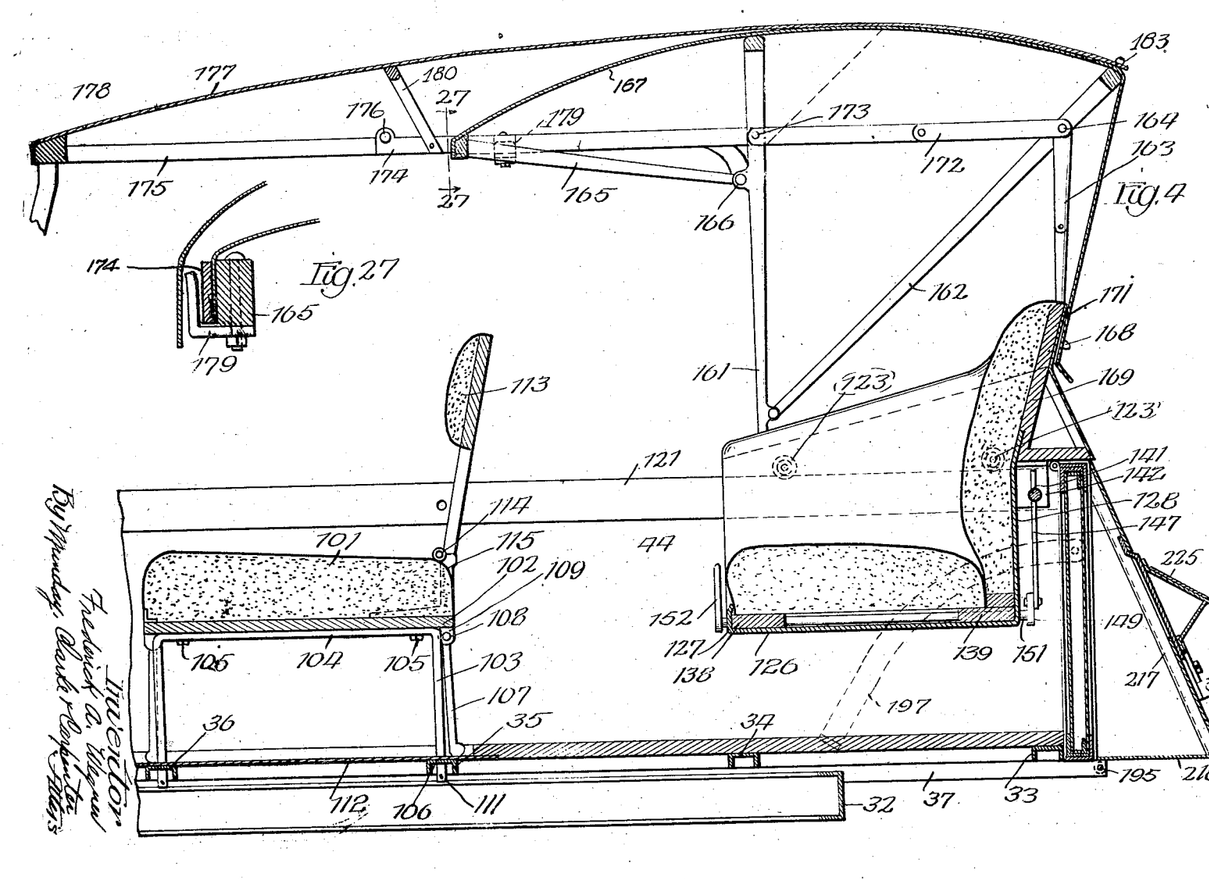
Fig. 4 is an enlarged partial section taken through the body with the parts arranged as shown in Fig. 1.
Fig. 27 is a section taken substantially on the line 27—27 of Fig. 4.
Figures 6, 7:
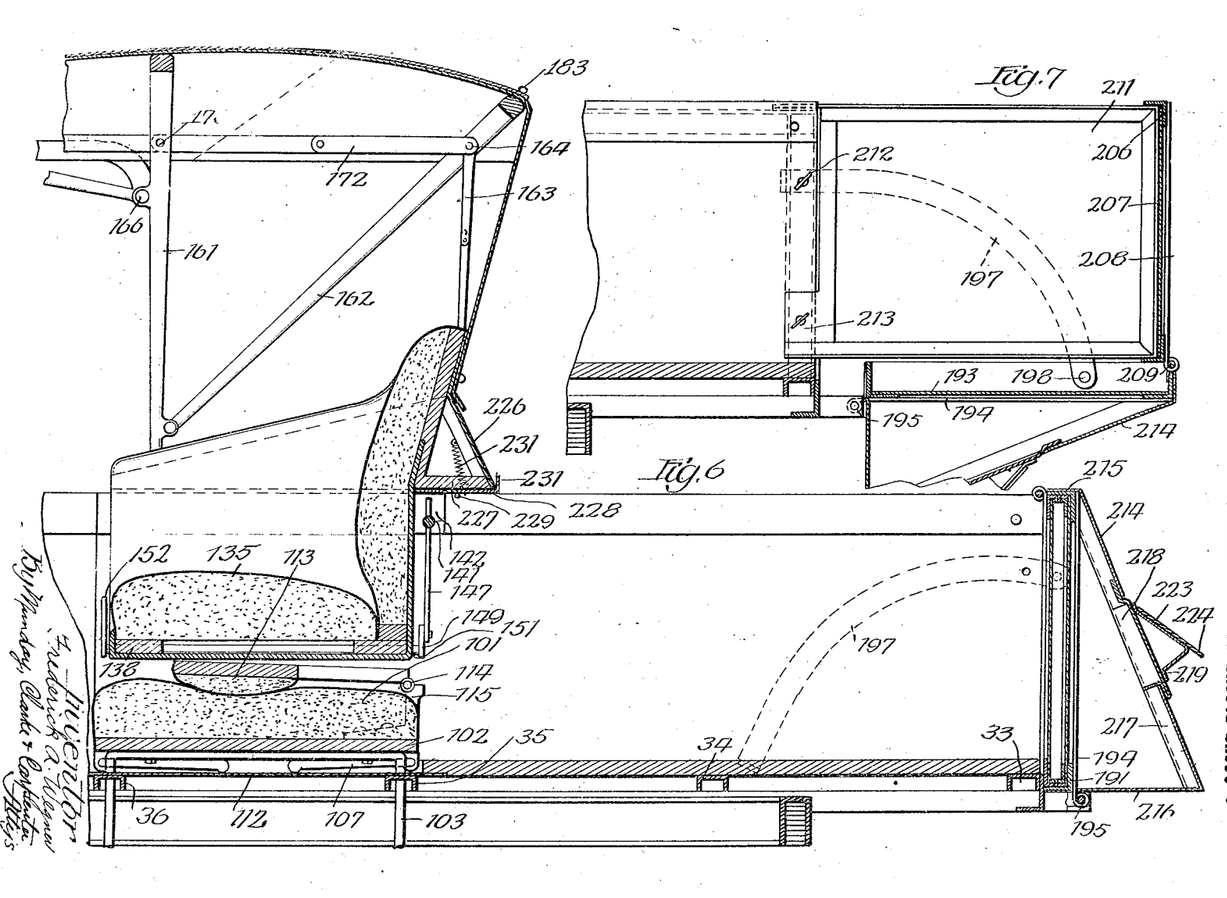
Fig. 6 is a similar view with the parts arranged as shown in Fig. 2 and also illustrates the arrangement for providing a short truck body.
Fig. 7 is a partial similar view showing the body extended to provide a relatively long truck body.

I provide means for locking this seat in both rear and front positions, which means comprise two rods 141 mounted in alinement behind the seat and having their adjacent ends supported in brackets 142 and their forward ends having like bearings in brackets 140 adjacent the side walls. Each of these rods is embraced by a spring 143 normally pushing toward the center of the seat and away from the side walls by engagement with the collar 144 on the rod, i. e. the springs normally pressing the rods toward unlocking position. I provide means for moving these rods away from each other and so that their ends 145 extend into recesses or openings 146 in the track members and when the seat is located in either front or rear position. This means comprises a separating member 147 having a tapered end 148 engaged in slots in the adjacent ends of the rod and pivotally connected to an arm 149 upon a shaft 151 which passes through the framework beneath the seat and has at its front end a manipulating arm 152. This arm is adapted to be moved over from a released position to horizontal position at one side to slightly past a locking position at the other, moving past a dead center position and maintaining the ends of the rods 141 in locked position. The top is carried primarily by the rear seat and is supported by the main bow 161 pivoted on the outer faces of the seat arms and having pivoted to it in turn a bow 162 extending up to the back of the top. Braces 163 are provided and connected to the bow 162 at 164 and to the outer face of the seat. A front auxiliary bow 165 is pivoted at 166 on the bow 161 and a top sheet of suitable material 167 extends from the bow 165 at the top over the bows 161 and 162 and down into button engagement at 168 with the back of the seat. The back of the seat near the top is formed of a wood member 169 extending up above the part 128 of plate 126 and having in turn secured to its outer face a finishing sheet 171 of metal. An additional brace 172 pivoted at 164 on the bow 162 and at 173 on the bow 161 is provided.

The top thus described and without auxiliary parts is well adapted for use in connection with the car arranged with the front seats elevated and the rear seat in rear position to provide a victoria. I provide a top extension to convert this victoria into the usual five-passenger car and this comprises a front bow formed of hinged members 174 and 175 pivoted together at their ends at 176 and to the bow 161 at 166. An auxiliary top sheet 177 is fixed to the front part 178 of the bow and extends back and over the sheet 167 as may be seen in Fig. 4. This extension bow is adapted to be attached to the wind shield at the front in any usual or preferred manner and it will be manifest that the whole top with the extension may be folded back out of the way in the usual fashion. If desired an additional bow 180 may be provided to hold the top sheet from drawing down.

Figure 2:
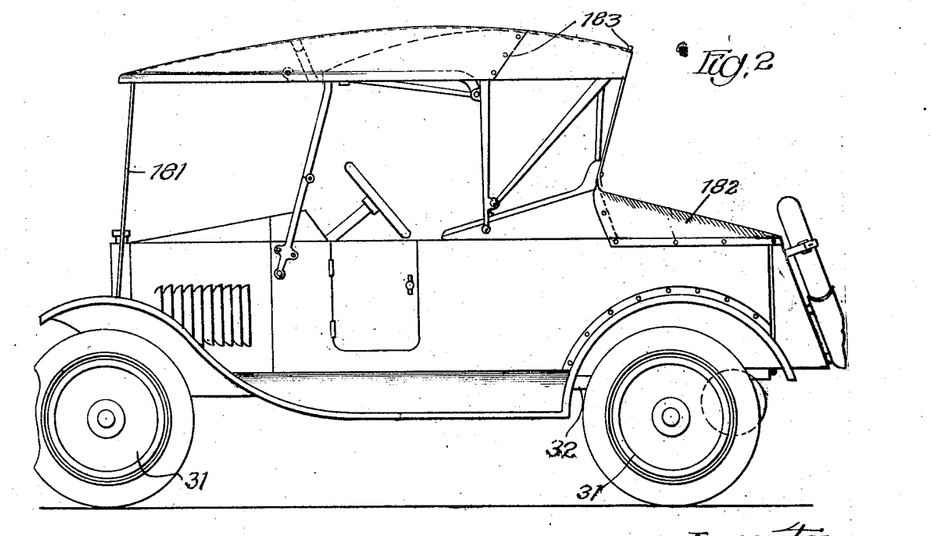
Fig. 2 is a similar view showing the arrangement as a runabout or roadster.

Viewing Fig. 27 it will be noted that I provide braces or brackets 179 fixed to the arms of the bow 165 and engaging beneath the parts 174 of the extension bow. When it is desired to use the car with the rear seat in the position of the front seats the top may be left extended and thus arranged to extend out over the wind shield and over the hood and engine as indicated in Fig. 2. Thus arranged I provide a pair of side rods 181, for supporting the front of the top from the front of the chassis and I also provide the cover sheet 182 adapted to button back over the rear ends of the tops of the side wall to give the car a neat appearance when the car is used as a runabout. It will, of course, be understood that the extension sheet and bow may be removed and the top employed merely as indicated in dotted lines in Fig. 2, if desired, the extension bow being readily disconnectible and the extension sheet buttoned merely as indicated at 183 to the top proper.

My invention contemplates the conversion of the body into a truck and to this end the sheet 182 may be left off permitting a limited trucking space back of the rear seat when in forward position.

I provide also for extension of the body outwardly at the rear to increase the trucking space and for certain other purposes as will be presently apparent. The back is constructed, as is perhaps best illustrated in Figs. 6, 7, 13, and 17 to 19. The end of the body is so constructed as to move down about a horizontal axis at its bottom to horizontal position forming an extension of the floor. It carries a supplemental end which may be then swung up to vertical position and this end in turn carries side wings movable outwardly to form extensions of the side walls.

The end of the body is constructed as will now be described. An angle iron member is bent to form a rectangular frame 191, one flange thereof being cut away to make mitre joints 192 at the corners. A floor plate 193 is secured within the angle iron framework and hinge straps 194 are positioned outside the angle and have hinge eyes 195 at the edge. These eyes are hinged in rearwardly extending ends 196 of channels 43, already described. The end thus constructed is adapted to stand in the vertical position shown, for example, in Fig. 6 and at each side is provided with a curved arm 197 which is pivoted at 198 to the angle frame. These arms extend up and through slots 199 provided in vertical body angle members 201 arranged at the rear end of each body wall and riveted as at 202 to the upstanding portions of channel 33. The inner wall sheet is turned in at 203 between the angle 201 and the channel 33 and the outer body wall is welded or otherwise secured to the angle 201 and has its rear edge extending therebeyond and bent into finished formation as indicated at 204.

The ends of the arms 197 are turned over as indicated at 205 to engage back of the channel 33 and hold the end in horizontal position. A supplemental or auxiliary end consistng of an angle iron bent to rectangular formation to provide a framework 206 and a back plate 207 is provided and this is hinged by hinge straps 208 at 209 to the outer or upper edge of the main end and in position to fold down within the angle framework 191. It carries two wings 211 pivoted within its vertical edges and adapted to be swung back against the inner face of the main body portions to provide extensions of the main body walls to complete the rear boxlike form of truck. These wings are provided with extensions 213, having set screws 212 adapted to engage into the channel 33. These wings are of angle iron edge construction and for a purpose to be hereinafter described preferably are arranged to form continuations of the track members 124. I provide on the outside of the end proper when in closed position a facing plate 214 secured at the top at 215 on the upper face of the angle framework and at the sides in like manner. This facing sheet extends down at an angle from the top of the end gate and the bottom space thus provided is closed by the sheet spacer 216 which may be integral with the facing sheet 214. I stiffen or reinforce this end sheet in any desired manner as indicated at 217 and preferably provide an opening therethrough at the center at 218 which may be closed by a door 219 to provide the compartment for carrying various articles.

Upon the outer face of this facing sheet I provide a tire rack comprising bottom receiving member 221 and upper leather fastenings 222. An inclined support 223 is provided upon the door and this support is adapted to receive the license plate 224, the arrangement being such that this license plate is displayed substantially at a 45° angle. The usual tail light, indicated at 225, may be provided in connection therewith. Thus arranged the license is in position to be viewed both when the end is elevated and when it is laid back to provide a truck extension, since in one instance it is positioned at 45° to the vertical one way and in the second at 45° to the vertical the other way. It will be manifest that this truck extension construction may be arranged in extended relation when the rear seat has been moved forward to occupy the positions of the front seat or when the rear seat is back in rear seat position. In this last mentioned arrangement it provides for the carrying of a trunk, suit case or other articles when the car is arranged to carry five passengers and without obstructing the foot room provided in front of each seat.

In order that the back seat may match nicely with the facing sheet 214 I provide an inclined back facing sheet 226 extending down and rearwardly from the back proper and against a horizontal support 227. In order that the back of the rear seat may not be marred by loads within the truck I provide a protecting angle member 228 hinged at 229 beneath the member 227 and adapted to be arranged either in the position shown in Fig. 6 or to be folded back so that the flange 231 lies close against the back of the seat as is desirable when the back seat is moved to rear position with the main end gate raised. A spring 232 holds this protecting angle in both positions.

Figures 11, 12:
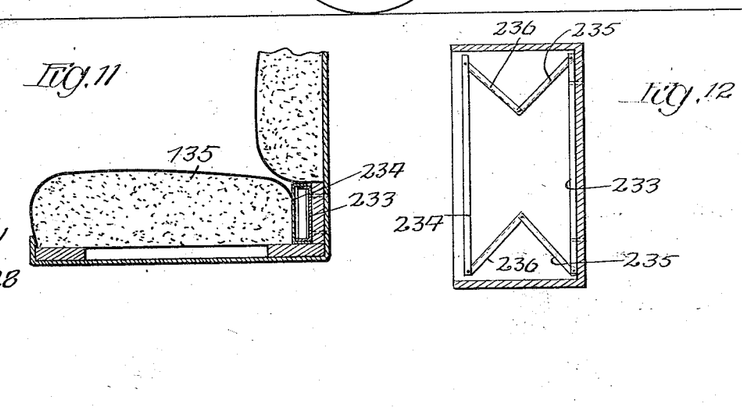
Fig. 11 is a transverse detail sectional view through the back seat showing the arrangement of the support for holding the seat cushion elevated for sleeping or bed purposes when the same is collapsed and stored back of cushion 135 and below the lower edge of the back cushion.
Fig. 12 is a horizontal section through said support when in operative position.
Figure 13:
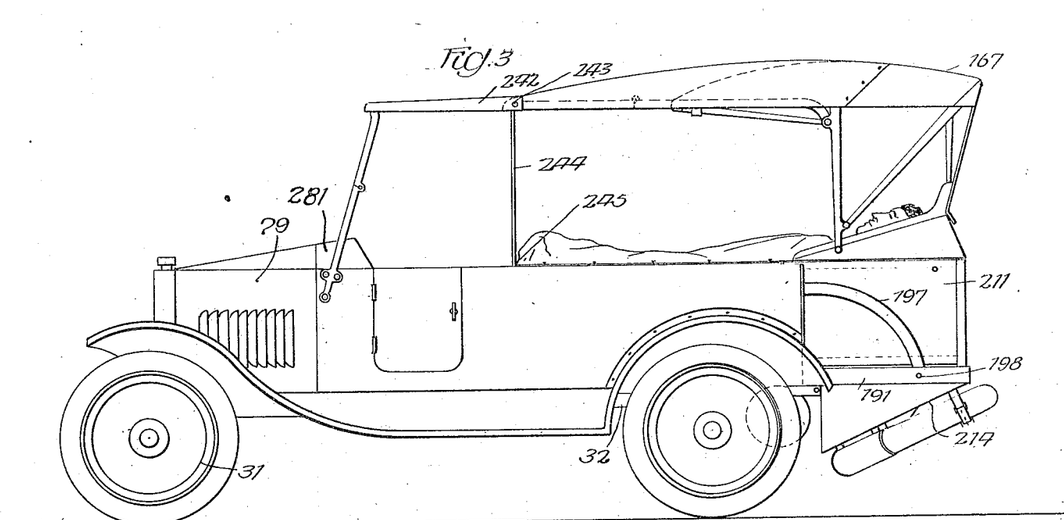
Fig. 13 is a partial top plan view of the rear of the body arranged as a truck.
Figure 14:
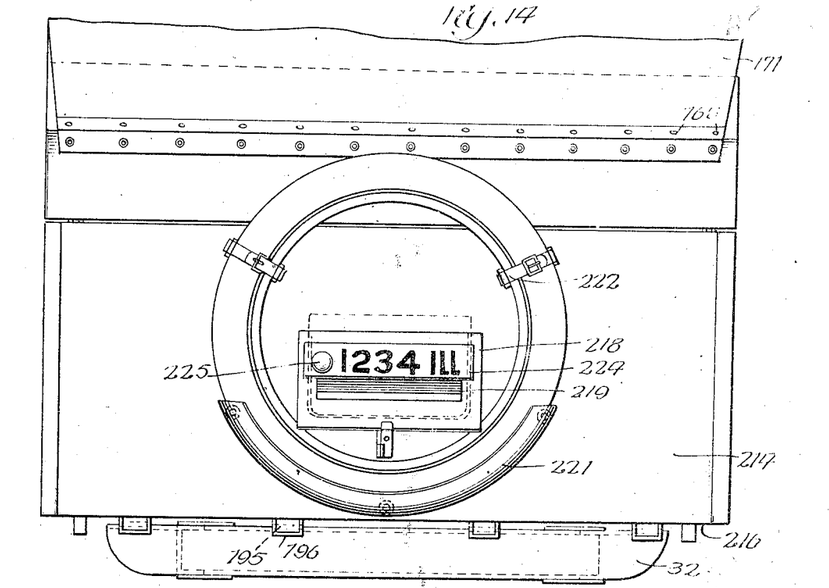
Fig. 14 is a rear elevation of the body when the back part is collapsed.
Figure 15:
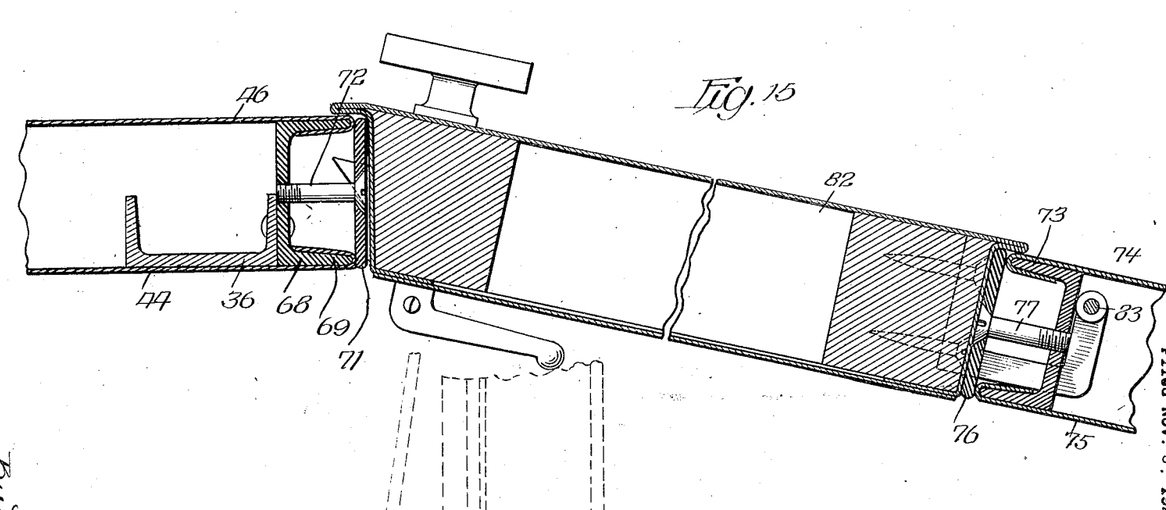
Fig. 15 is an enlarged partial horizontal section through a door.

A car body embodying my invention is well adapted for arrangement as a sleeping compartment and this I accomplish in the present instance by arranging the body extension and moving back the rear seat to the position shown in Fig. 5. I lower the front seats to inoperative position and raise the seat cushion of the back seat until its top is substantially level with the top edges of the side walls. This is accomplished by means of an extendible frame comprising front and back members 233 and 234 connected together by hinged braces 235 and 236. Fig. 12 shows the arrangement of this cushion support upon the rear seat and Fig. 11 shows it collapsed and arranged behind the cushion proper and beneath the back of the seat in the position it is intended it shall be placed when not in use. I provide a plurality of buttons 237 on the top edges of the main body walls and to these I secure the edges of a bed sheet 238, which is preferably supported along its center by extensible pipe members 239 telescoping in adjacent ends and supported by detachable legs 241 positioned to extend up from the floor. The bed arrangement, including the bed sheet, the pipes 239 and legs 241, may be taken down and conveniently stored in the compartment in the end.

I provide also for an extension of the top when the rear seat is in this extended position, as is indicated in Fig. 3, this top consisting of a further auxiliary top member 242 securable at its ends at 243 to the front end of extension bow 175 and to the top of the wind shield. If desired, auxiliary top supports 244 may also be provided, being secured at 243 (already mentioned) and set into suitable recesses 245 in the tops of the side walls in appropriate location.

Figure 16:
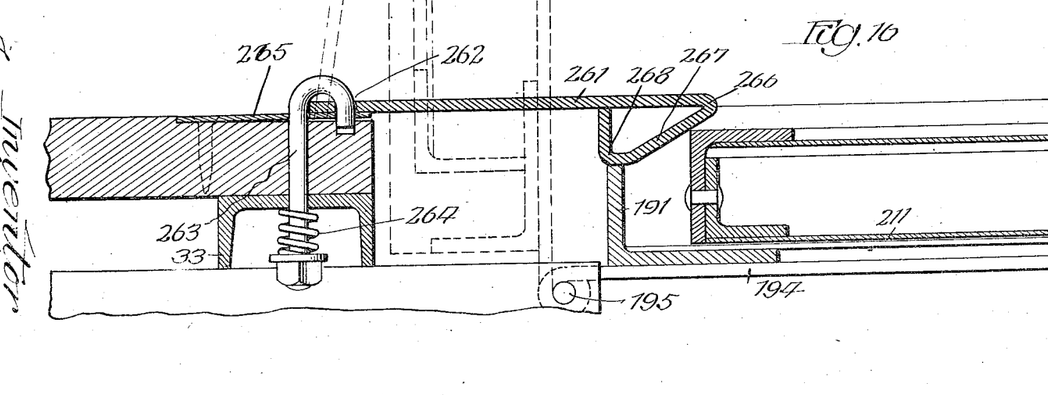
Fig. 16 is an enlarged partial vertical section showing the relation of the extensible end of the main body.
Figure 17:
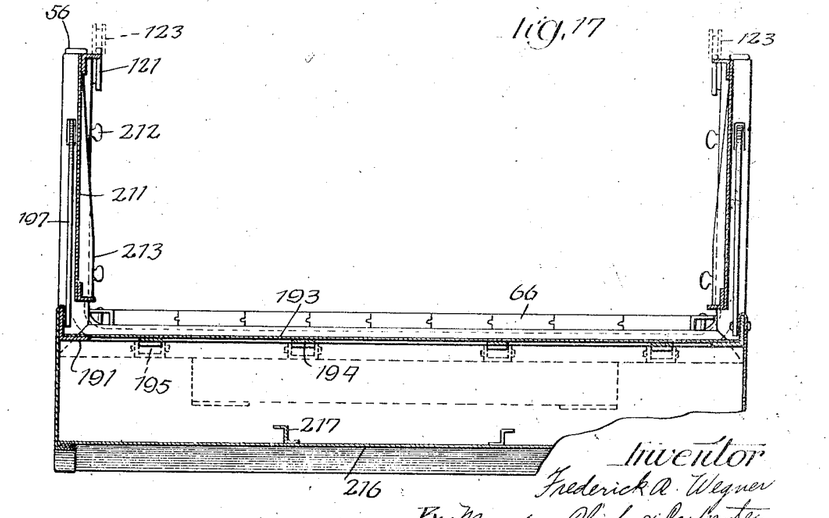
Fig. 17 is a vertical section through the extension when the extension is arranged to provide an elongated truck.
Figure 18:
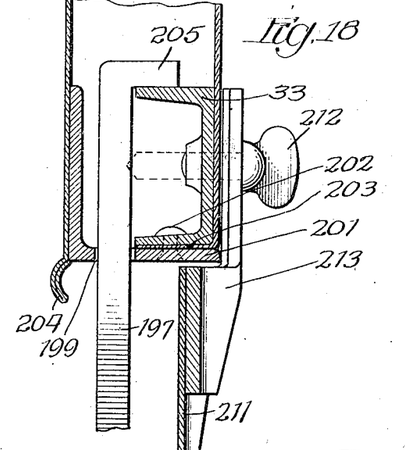
Fig. 18 is a partial section taken horizontally through the connection between the extensible truck part and the main body side wall.
Figure 19:
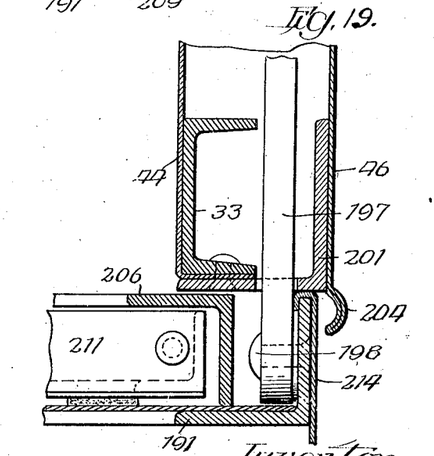
Fig. 19 is a horizontal section through the same when the parts are contracted.

In order that the space between the angle framework of the end when arranged in horizontal position may be closed I have provided a floor plate 261 as indicated in Fig. 16. This floor plate is provided with openings 262 along its edge adjacent the front of the car and through these openings extend U-bolts 263 positioned through the floor and through the channel 33 and pressed down by springs 264. The U-bolts preferably also pass through a spring plate 265 tending with the springs 264 to hold the plate 261 against rattling. The forward edge of this plate is bent back at 266 to provide an inclined part 267 upturned at its end at 268 against the body of the plate, the bend 268 being adapted to rest upon the adjacent angle edge.

At the front of the body I prefer to provide means for protecting the coils and wires from water as the result of rain beating upon the hood and body. I provide a cowl member 281 of any usual or preferred construction and therebeneath an upright body front wall 282 also of any usual or preferred construction and adapted to be disposed against the edge 283 usually provided. The rear edge of the hood 284 extends up over the cowl and the forward edge of the cowl is bent into a valley or groove part 285 to catch any water entering beneath the hood edge and provides a channel extending around and down at the sides to carry such water off without permitting it to flow or fall down upon the coiled wires and other engine parts.

If desired, advertising matter may be displayed on the outer faces of the side wall extensions and this will be hidden when the body is arranged for passenger use only.

It is though that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a convertible automobile body, the combination of a vertically collapsible front seat with folding support beneath and having a back hinged to fold on top of said seat whereby the seat is dropped right side up to the lowered position, a slidably adjustable rear seat, slide ways on the side walls for said slidable seat, said front seat being collapsible vertically from the usable position and said slidable rear seat being adjustable from its rear position to a front usable position, said front usable position of said rear seat being that occupied by said front seat when in usable position.

2. In a convertible automobile body, the combination of a rear seat having an automobile top, and an adjustable front seat movable to a position within the body, and unobstructing the truck space therein to permit the body serving as a truck.

3. In a convertible automobile body, the combination of side walls, and an end wall connected to an end thereof to arrange the body for passenger use and movable from position to connect the ends of side walls, and an additional end wall arrangeable at a position back of the position of said first mentioned end wall, and means extending the side walls to said second mentioned end wall when the second mentioned end wall is in operative position, and means connecting said truck end wall with said side walls to provide a closed box.

4. In a convertible automobile body, the combination of side walls, a bottom wall, an end wall pivotally connected to said bottom wall and to swing down to horizontal position, and an auxiliary end wall adapted to extend up from said main end wall when said main end wall is in horizontal position, and auxiliary side extension walls for connecting said auxiliary end wall with the main side walls, said auxiliary side extension wall being pivotally connected at the sides of the said auxiliary end wall.

5. In a convertible automobile body, the combination of side walls, a bottom wall, an end wall pivotally connected to said bottom wall and to swing down to horizontal position, and an auxiliary end wall adapted to extend up from said main end wall when said main end wall is in horizontal position, and auxiliary side extension walls for connecting said auxiliary end wall with the main side walls, said auxiliary end wall being pivoted along the edge of the main end wall and the side extension walls being pivoted along the side edges of the auxiliary end wall, whereby the side extension walls may be swung to inoperative position against the auxiliary end wall and the auxiliary end wall thereafter swung down on the main end wall.

6. In a convertible automobile body, the combination of main body walls, and extensible rear end thereof, and a seat adapted to be supported upon said main body walls and upon said extension in different arrangements of said body.

FREDERICK A. WEGNER.